US010331611B2

(12) United States Patent
Hundal et al.

(10) Patent No.: US 10,331,611 B2
(45) Date of Patent: Jun. 25, 2019

(54) DEVICES AND METHODS FOR PROVIDING REDUCED BANDWIDTH DISPLAYPORT COMMUNICATION

(71) Applicant: Icron Technologies Corporation, Burnaby (CA)

(72) Inventors: Sukhdeep Singh Hundal, Surrey (CA); Ardeshir Saghafi, Surrey (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 16/235,174

(22) Filed: Dec. 28, 2018

(65) Prior Publication Data

US 2019/0138489 A1   May 9, 2019

Related U.S. Application Data

(63) Continuation of application No. 14/919,622, filed on Oct. 21, 2015, now Pat. No. 10,169,286.

(60) Provisional application No. 62/066,670, filed on Oct. 21, 2014.

(51) Int. Cl.
    *G06F 13/42* (2006.01)
(52) U.S. Cl.
    CPC ................. *G06F 13/4282* (2013.01)
(58) Field of Classification Search
    CPC .................................................. G06F 13/4282
    USPC ..................................................... 375/240.26
    See application file for complete search history.

(56) References Cited

U.S. PATENT DOCUMENTS

| 8,549,197 | B2 | 10/2013 | Hall |
| 8,615,611 | B2 | 12/2013 | Hall |
| 2003/0156649 | A1 | 8/2003 | Abrams, Jr. |
| 2011/0157201 | A1 | 6/2011 | Hedges |
| 2015/0365220 | A1 | 12/2015 | Sultenfuss et al. |
| 2017/0017595 | A1* | 1/2017 | Schnell ................. G06F 13/385 |

OTHER PUBLICATIONS

"DisplayPort v1.3: Feature Summary," Sep. 18, 2014, VESA (Video Electronics Standards Association), 14 pages.

(Continued)

*Primary Examiner* — Jeffery A Williams
(74) *Attorney, Agent, or Firm* — Christensen O'Connor Johnson Kindness PLLC

(57) ABSTRACT

In some embodiments, the present disclosure provides techniques for reducing an amount of bandwidth used for the communication of DisplayPort information via a USB Type-C receptacle. In some embodiments, this reduction in bandwidth allows for the concurrent exchange of USB 2.0 information, SuperSpeed information, and four lanes of DisplayPort information via a single USB Type-C receptacle. In some embodiments, this may be accomplished in part by processing the information from the four DisplayPort lanes to be transmittable via two differential pairs of the USB Type-C connection, thereby providing four lanes of DisplayPort communication over the USB Type-C connection concurrently with SuperSpeed information. In some embodiments, the reduction in bandwidth of the DisplayPort information may be used for other purposes, such as transmitting high bandwidth DisplayPort information over a cable or connector of a low quality that would otherwise not support such an exchange.

20 Claims, 8 Drawing Sheets

(56) References Cited

OTHER PUBLICATIONS

International Search Report and Written Opinion dated Dec. 24, 2015, issued in corresponding International Application No. PCT/CA2015/051065, filed Oct. 21, 2015, 10 pages.
Lewis, D., "SerDes Architectures and Applications," DesignCon 2004, Santa Clara, Calif., Feb. 2-5, 2004, 14 pages.
Smith, R., "DisplayPort Alternate Mode for USB Type-C Announced—Video, Power, & Data All Over Type-C," Sep. 22, 2014, AnandTech, <http://www.anandtech.com/show/8558/displayport-alternate-mode-for-usb-typec-announced> [retrieved Dec. 21, 2015], 8 pages.
Smith, R., "VESA Releases DisplayPort 1.3 Standard: 50% More Bandwidth, New Features," Sep. 16, 2014, AnandTech, <http://www.anandtech.com/show/8533/vesa-releases-displayport-13-standard-50-more-bandwidth-new-features> [retrieved Dec. 21, 2015], 6 pages.
"Universal Serial Bus 3.1 Specification," Revision 1.0, Jul. 26, 2013, Hewlett-Packard Company, Intel Corporation, Microsoft Corporation, Renesas Corporation, ST-Ericsson, and Texas Instruments, 631 pages.
"Universal Serial Bus Power Delivery Specification," Revision 2.0, V1.1, May 7, 2015, Hewlett-Packard Company, Intel Corporation, LSI Corporation, Microsoft Corporation, Renesas, ST-Microelectronics, and Texas Instruments, 544 pages.
"Universal Serial Bus Specification," Revision 2.0, Apr. 27, 2000, Compaq Computer Corporation, Hewlett-Packard Company, Intel Corporation, Lucent Technologies Inc, Microsoft Corporation, NEC Corporation, and Koninklijke Philips Electronics N.V., 650 pages.
"Universal Serial Bus Type-C Cable and Connector Specification," Revision 1.1, Apr. 3, 2015, USB 3.0 Promoter Group, 180 pages.
"VESA DisplayPort Alt Mode for USB Type-C Standard: Feature Summary," PowerPoint presentation, Sep. 22, 2014, VESA, <http://www.displayport.org/wp-content/uploads/2014/09/DP-Alt-Mode-Overview-for-VESA-v1.pdf> [retrieved Dec. 31, 2015], 17 pages.
"VESA DisplayPort Standard: Version 1, Revision 1a," Jan. 11, 2008, VESA (Video Electronics Standards Association), 238 pages.
Walls, F., and S. MacInnis, "VESA Display Stream Compression," Mar. 3, 2014, VESA (Video Electronics Standards Association), 5 pages.

* cited by examiner

DEVICES AND METHODS FOR PROVIDING REDUCED BANDWIDTH DISPLAYPORT COMMUNICATION

CROSS-REFERENCE TO RELATED APPLICATION

This application is a continuation of U.S. patent application Ser. No. 14/919,622, filed Oct. 21, 2015, which claims the benefit of Provisional Application No. 62/066,670, filed Oct. 21, 2014, the entire disclosures of which are hereby incorporated by reference herein for all purposes.

BACKGROUND

Standards have been published that describe a universal serial bus (USB) Type-C connector, plug, and cable that can support communication via USB 2.0, SuperSpeed, and DisplayPort via the same connector, including concurrent communication of at least some of these signals. USB 2.0 communication can include low-speed, full-speed, and high-speed communication, and is described in detail at least in "Universal Serial Bus Specification, Revision 2.0," released on Apr. 27, 2000, by Compaq et al. SuperSpeed communication includes normal SuperSpeed communication and Enhanced SuperSpeed communication. SuperSpeed communication is described in detail at least in "Universal Serial Bus 3.1 Specification, Revision 1.0," released on Jul. 26, 2013, by Hewlett-Packard Company et al. USB Type-C connectors, plugs, and cables are described in detail at least in "Universal Serial Bus Type-C Cable and Connector Specification, Revision 1.1," released on Apr. 3, 2015, by USB 3.0 Promoter Group. Power delivery over USB and the negotiation thereof is described in detail at least in "Universal Serial Bus Power Delivery Specification, Revision 2.0, Version 1.1," released on May 7, 2015, by Hewlett-Packard Company et al. DisplayPort communication is described in detail at least in "VESA DisplayPort Standard, Version 1.3," released on Sep. 15, 2015, by VESA. Communication of DisplayPort information over a USB Type-C interface is described in detail at least in the VESA DisplayPort Alt Mode Standard, Version 1, released on Sep. 22, 2014, by VESA. Each of these documents and their contents are known to one of ordinary skill in the art, and are hereby incorporated by reference herein along with any earlier versions or related documents mentioned therein in their entireties for all purposes.

When SuperSpeed communication and DisplayPort communication are being concurrently transmitted according to these specifications, at most two differential pairs of conductors are provided for use by DisplayPort. Accordingly, using the existing techniques, only two lanes of DisplayPort communication are allowed to be transmitted concurrently with SuperSpeed communication. What is needed are techniques for allowing four lanes of DisplayPort connectivity via a USB Type-C connection while concurrently providing SuperSpeed and USB 2.0 communication over the same connection.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided that comprises a USB host controller or hub device, a DisplayPort GPU, a bandwidth reduction device, a USB Type-C receptacle for use as a downstream facing port (DFP), and a switching device. The switching device is communicatively coupled to the USB host controller or hub device, the DisplayPort GPU, the bandwidth reduction device, and the USB Type-C receptacle. The switching device is configured to determine whether an upstream facing port (UFP) coupled to the USB Type-C receptacle supports reduced bandwidth transmission of DisplayPort information. In response to determining that the UFP does support reduced bandwidth transmission of DisplayPort information, the switching device is configured to couple a first lane differential pair, a second lane differential pair, a third lane differential pair, and a fourth lane differential pair of the DisplayPort GPU to the bandwidth reduction device; and couple one or more output differential pairs of the bandwidth reduction device to pins of the USB Type-C receptacle.

In some embodiments, a bandwidth reduction device is provided. The bandwidth reduction device is configured to be coupled via a switching device to a USB Type-C receptacle configured to provide a downstream facing port (DFP). The bandwidth reduction device is further configured to receive video data transmitted over four lanes of DisplayPort data via a first lane differential pair, a second lane differential pair, a third lane differential pair, and a fourth lane differential pair; compress the video data using a video compression technique; and output the compressed video data for transmission via the USB Type-C receptacle.

In some embodiments, a method for transmitting reduced bandwidth DisplayPort information via a downstream facing port (DFP) that includes a USB Type-C connector is provided. Capabilities are exchanged between the DFP and an upstream facing port (UFP). In response to determining that both the DFP and the UFP support matching techniques for communicating reduced bandwidth DisplayPort information, a first lane of DisplayPort information, a second lane of DisplayPort information, a third lane of DisplayPort information, and a fourth lane of DisplayPort information are provided to a bandwidth reduction device; and one or more outputs of the bandwidth reduction device are provided to pins of the USB Type-C receptacle.

In some embodiments, a system comprising a USB device or hub, a DisplayPort sink, a lane recovery device, a USB Type-C receptacle, and a switching device is provided. The USB Type-C receptacle is configured for use as an upstream facing port (UFP). The switching device is communicatively coupled to the USB device or hub, the DisplayPort sink, the lane recovery device, and the USB Type-C receptacle. The switching device is configured to determine whether a downstream facing port (DFP) coupled to the USB Type-C receptacle supports reduced bandwidth transmission of DisplayPort information; and, in response to determining that the DFP does support reduced bandwidth transmission of DisplayPort information, to couple a first lane differential pair, a second lane differential pair, a third lane differential pair, and a fourth lane differential pair of the DisplayPort sink to the lane recovery device; and to couple one or more input differential pairs of the lane recovery device to pins of the USB Type-C receptacle.

In some embodiments, a lane recovery device is provided. The lane recovery device is configured to be coupled via a switching device to a USB Type-C receptacle configured to provide an upstream facing port (UFP). The lane recovery device is further configured to receive packetized data via one or more input differential pairs from the USB Type-C receptacle; recover compressed video data from the packetized data; decompress the compressed video data to recover source video data using a technique related to a video compression technique used to compress the source video data; and transmit four lanes of DisplayPort information based on the source video data to a DisplayPort sink.

In some embodiments, a method for receiving reduced bandwidth DisplayPort information via an upstream facing port (UFP) that includes a USB Type-C connector is provided. Capabilities are exchanged between the UFP and a downstream facing port (DFP). In response to determining that both the DFP and the UFP support matching techniques for communicating reduced bandwidth DisplayPort information, signals are provided from one or more pairs of SuperSpeed pins of the USB Type-C receptacle to one or more inputs of a lane recovery device; and a first lane of DisplayPort information, a second lane of DisplayPort information, a third lane of DisplayPort information, and a fourth lane of DisplayPort information are provided from the lane recovery device to a DisplayPort sink.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments, the present disclosure provides techniques for reducing an amount of bandwidth used for the communication of DisplayPort information via a USB Type-C receptacle. In some embodiments, this reduction in bandwidth allows for the concurrent exchange of USB 2.0 information, SuperSpeed information, and four lanes of DisplayPort information via a single USB Type-C receptacle. In some embodiments, this may be accomplished in part by processing the information from the four DisplayPort lanes to be transmittable via two differential pairs of the USB Type-C connection, thereby providing four lanes of DisplayPort communication over the USB Type-C connection concurrently with SuperSpeed information. In some embodiments, the reduction in bandwidth of the DisplayPort information may be used for other purposes, such as transmitting high bandwidth DisplayPort information over a cable or connector of a low quality that would otherwise not support such an exchange.

Figure 1A:
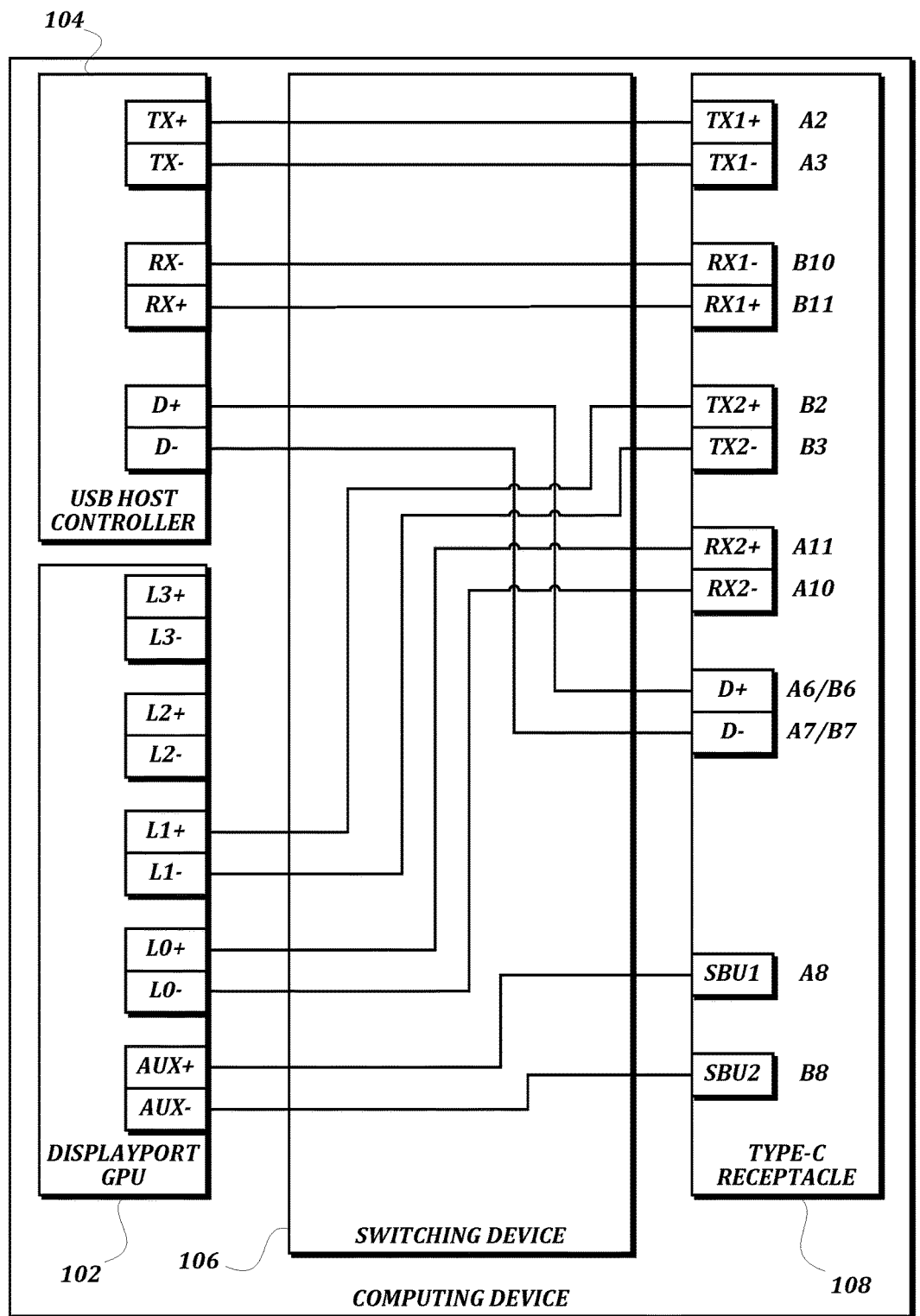
FIG. 1A illustrates a typical embodiment of concurrent transmission of USB 2.0, SuperSpeed, and DisplayPort communication via a USB Type-C receptacle according to the published standards.

FIG. 1A illustrates a typical embodiment of concurrent transmission of USB 2.0, SuperSpeed, and DisplayPort communication via a USB Type-C receptacle according to the published standards. The illustrated computing device 100 includes a USB host controller 104, a DisplayPort graphical processing unit (GPU) 102, a switching device 106, and a USB Type-C receptacle 108. The computing device 100 may be any type of computing device that includes these components, including but not limited to a laptop computing device, a desktop computing device, a tablet computing device, and/or any other type of computing device that includes the illustrated elements. Also, though a computing device 100 with a USB Type-C receptacle that acts as a downstream facing port is illustrated, one of ordinary skill in the art will recognize that similar techniques may be used by a USB Type-C receptacle that acts as an upstream facing port to provide access to a USB device or hub and a DisplayPort sink.

As illustrated, the USB host controller 104 provides a SuperSpeed transmit differential pair (TX+/TX−), a SuperSpeed receive differential pair (RX+/RX−), and a USB 2.0 differential pair (D+/D−). One of ordinary skill in the art will recognize that the USB host controller 104 may optionally provide a second set of SuperSpeed transmit and receive differential pairs to support reversible connections. Because the switching device 106 would only couple an active set of SuperSpeed differential pairs to the USB Type-C receptacle 108, the optional set of SuperSpeed differential pairs has not been illustrated herein, but one of ordinary skill in the art will recognize that the second optional set of SuperSpeed differential pairs could be used instead of the illustrated set of differential pairs without departing from the scope of the present disclosure. As illustrated, the DisplayPort GPU 102 provides four lanes of DisplayPort output, each of which is transmitted using a separate differential pair (L0+/L0−; L1+/L1−; L2+/L2−; L3+/L3−). The DisplayPort GPU 102 also provides an auxiliary (AUX) channel via an AUX differential pair (AUX+/AUX−) for command signaling.

Upon connection of a plug to the USB Type-C receptacle 108 and detection of plug orientation and cable twist, the switching device 106 couples conductors of the USB host controller 104 and the DisplayPort GPU 102 to the pins of the USB Type-C receptacle 108.

Assuming an un-flipped connection, the switching device 106 couples the SuperSpeed transmit differential pair to a first set of SuperSpeed transmit pins A2 and A3, the SuperSpeed receive differential pair to a first set of SuperSpeed receive pins B10 and B11, and the USB 2.0 differential pair to a pair of USB 2.0 pins A6/B6 and A7/B7. This leaves the second set of SuperSpeed transmit pins B2 and B3, and the second set of SuperSpeed receive pins A11 and A10 open for DisplayPort communication. As such, to support concurrent transmission of SuperSpeed and DisplayPort information via the USB Type-C connector per the standards, the switching device 106 couples the first lane differential pair to the second set of SuperSpeed receive pins A11 and A10, and the second lane differential pair to the second set of SuperSpeed transmit pins B2 and B3. The switching device 106 also couples the AUX differential pair to the pair of SBU pins A8 and B8. One of ordinary skill in the art will recognize that if the plug were inserted in a flipped configuration, different pins of the USB Type-C receptacle may be used. For example, the SuperSpeed transmit differential pair may be coupled to the second set of SuperSpeed transmit pins B2 and B3, and so on.

Figure 1B:
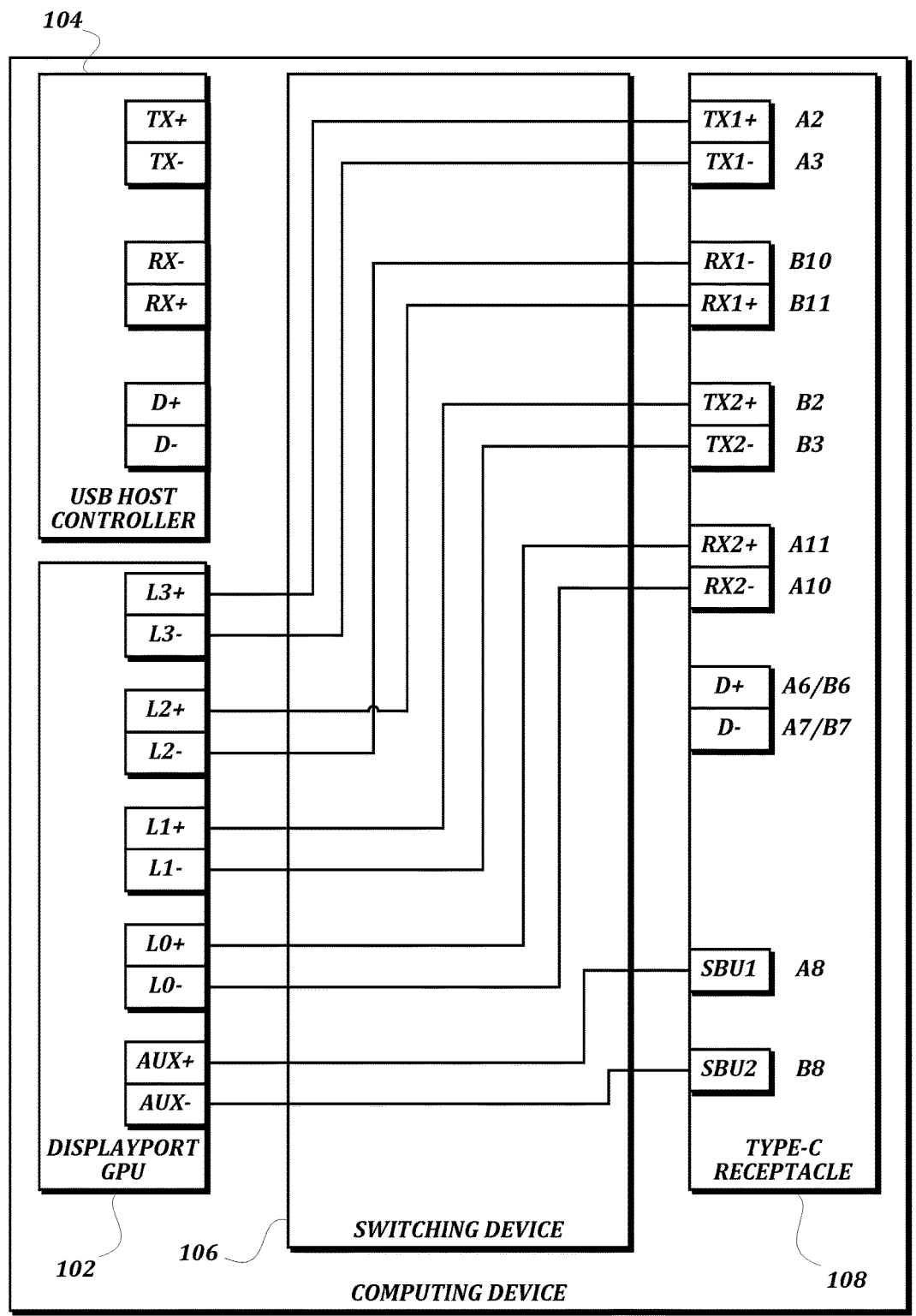
FIG. 1B illustrates a typical embodiment of a standard computing device configured to transmit full bandwidth DisplayPort information via the USB Type-C receptacle.

The standard embodiment illustrated in FIG. 1A allows for concurrent operation of DisplayPort and SuperSpeed via the USB Type-C receptacle, but it only provides limited performance because only two lanes out of four possible lanes of DisplayPort communication are supported. FIG. 1B illustrates a typical embodiment of a standard computing device 100 configured to transmit full bandwidth DisplayPort information via the USB Type-C receptacle 108. As illustrated, the first lane differential pair is coupled to the second set of SuperSpeed receive pins A11 and A10, the second lane differential pair is coupled to the second set of SuperSpeed transmit pins B2 and B3, the third lane differential pair is coupled to the first set of SuperSpeed receive pins B10 and B11, and the fourth lane differential pair is coupled to the first set of SuperSpeed transmit pins A2 and A3. As above, the AUX differential pair is coupled to the pair of SBU pins A8 and B8.

Though this configuration supports full bandwidth DisplayPort communication, it is only allowed in the standard configurations outlined in the specifications if SuperSpeed information is not being communicated because it uses all of the conductors in the USB Type-C receptacle 108 and cable for the DisplayPort communication.

Figure 2:
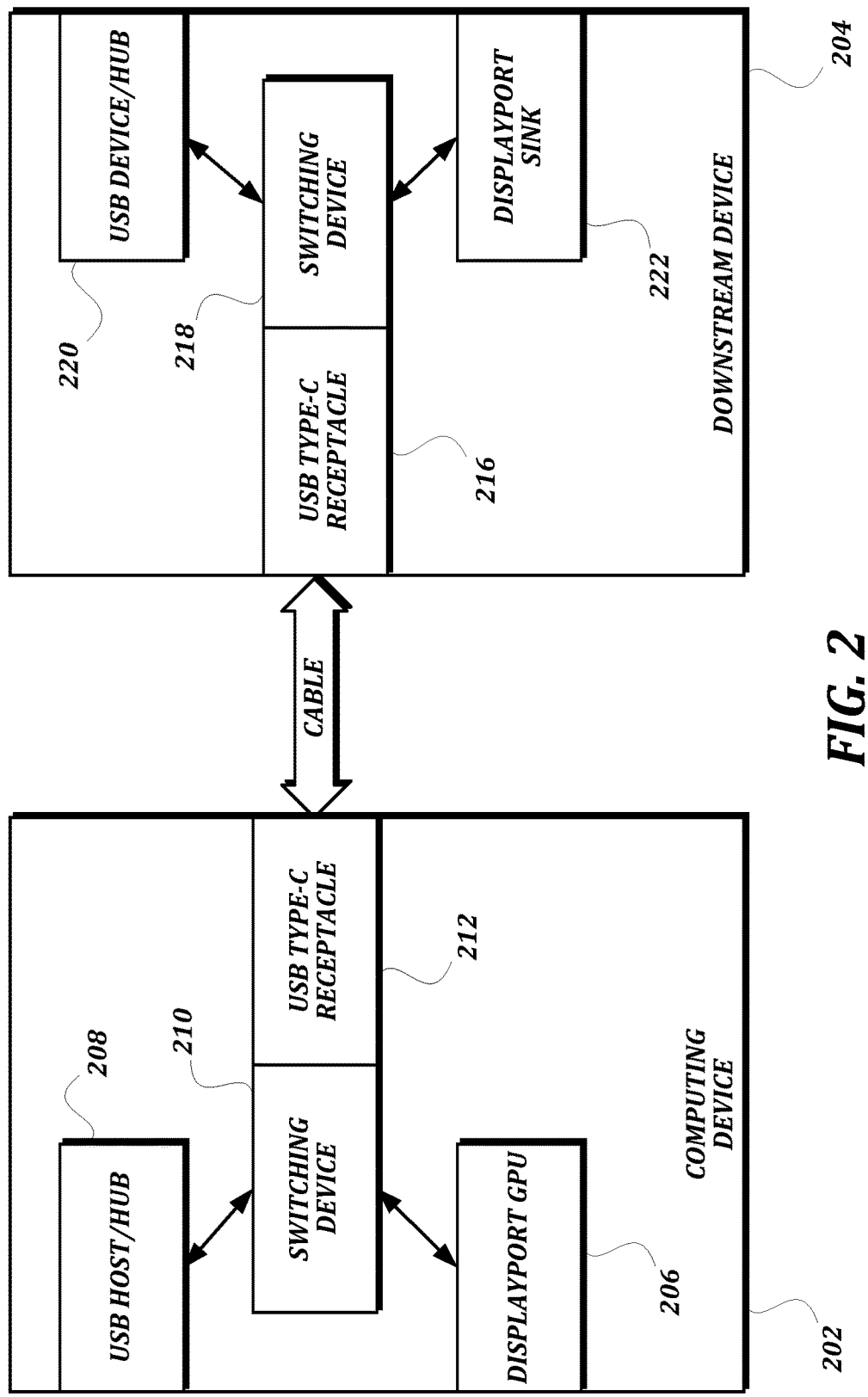
FIG. 2 is a block diagram that illustrates an exemplary embodiment of a topology according to various aspects of the present disclosure.

FIG. 2 is a block diagram that illustrates an exemplary embodiment of a topology according to various aspects of the present disclosure. In the topology illustrated in FIG. 2, the functionality of the present disclosure is built into a computing device 202 and a downstream device 204. A computing device 202, such as a laptop computing device, a desktop computing device, a tablet computing device, a smartphone computing device, and/or any other suitable type of computing device, includes a USB host or hub 208 (i.e., a device having a USB downstream facing port), a DisplayPort graphical processing unit (GPU) 206, and a switching device 210. In some embodiments, at least some portions of the switching device 210 (or the logic thereof) may be embedded within the USB host or hub 208 or the DisplayPort GPU 206. In some embodiments, the functionality of the switching device 210 may be provided by an embedded ASIC or a microcontroller on a printed circuit board assembly that is communicatively coupled to the USB host or hub 208 and the DisplayPort GPU 206. The switching device 210 selectively couples conductors of the USB host or hub 208 and the DisplayPort GPU 206 to a bandwidth reduction device and/or pins of the USB Type-C receptacle 212 as discussed in further detail below.

As illustrated, a cable couples the USB Type-C receptacle 212 of the computing device 202 to a USB Type-C receptacle 216 of a downstream device 204. The downstream device 204 may be any type of device that includes a DisplayPort sink and a USB device or hub, including but not limited to a monitor having an embedded USB hub or device, a projector having an integrated input device, a communication hub, and/or the like. The pins of the USB Type-C receptacle 216 are selectively coupled to a lane recovery device and/or a downstream USB device or hub 220 (i.e., a device having a USB upstream facing port) and/or a DisplayPort sink 222 by a switching device 218 as discussed in further detail below. As with the switching device 210, at least a portion of the switching device 218 (or logic thereof) may be embedded within the USB device or hub 220 or the DisplayPort sink 222, or may be provided by an embedded ASIC or a microcontroller on a printed circuit board assembly that is communicatively coupled to the USB device or hub 220 and the DisplayPort sink 222. In some embodiments, either the USB Type-C receptacle 212 or the USB Type-C receptacle 216 may be omitted if the corresponding end of the cable is captive and thereby coupled directly to the corresponding switching device.

Figure 3:
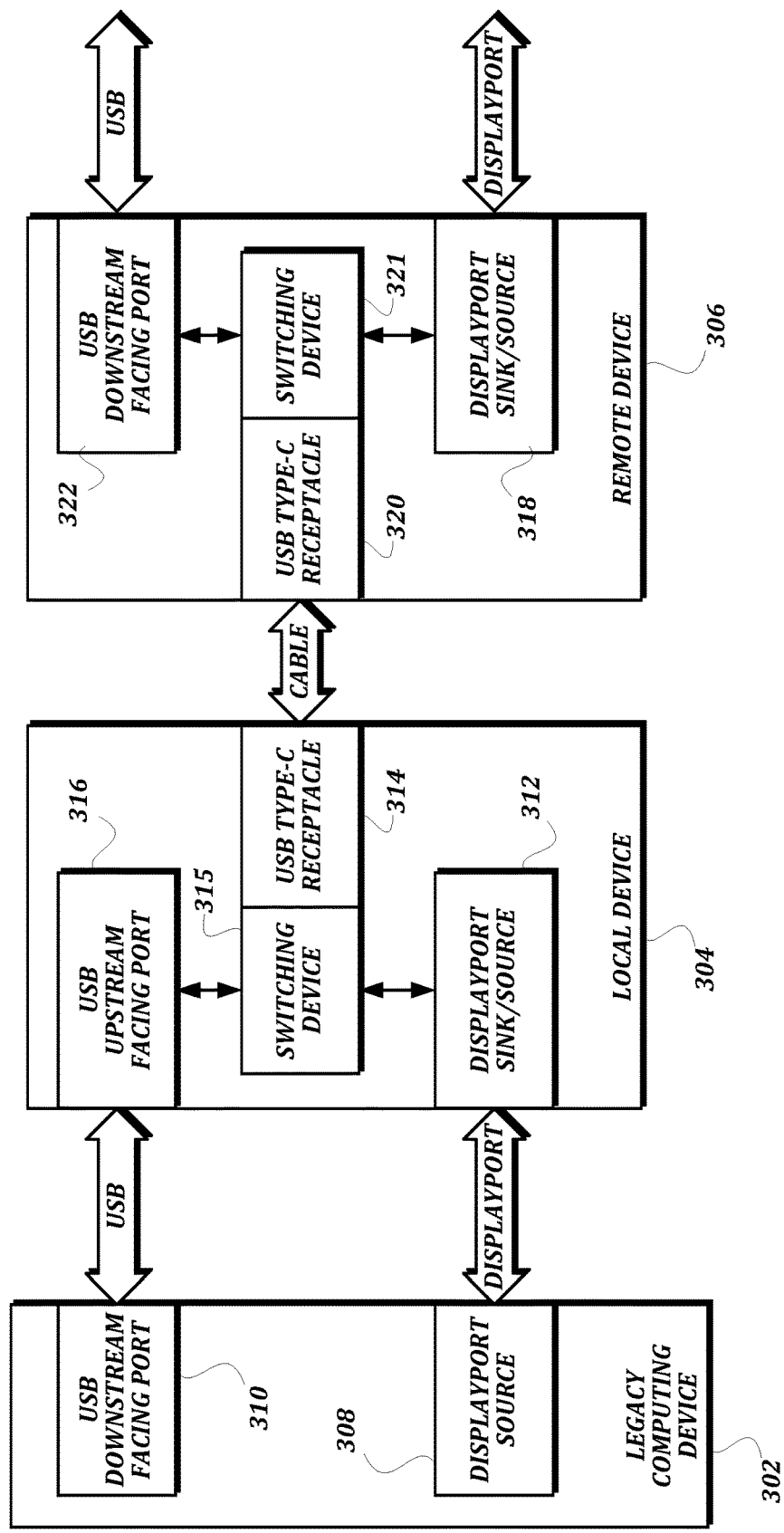
FIG. 3 is a block diagram that illustrates another exemplary embodiment of a topology according to various aspects of the present disclosure.

FIG. 3 is a block diagram that illustrates another exemplary embodiment of a topology according to various aspects of the present disclosure. In the topology illustrated in FIG. 3, the functionality of the present disclosure is provided for a legacy computing device by a local device 304 external from the legacy computing device. The legacy computing device 302 includes a USB downstream facing port 310 and a DisplayPort source 308. The local device 304 includes a USB upstream facing port 316 and a DisplayPort sink/source 312. The USB upstream facing port 316 is coupled to the USB downstream facing port 310 using a USB cable (or any other suitable technique), and provides functionality similar to an upstream facing port of a USB hub (not illustrated). The DisplayPort sink/source 312 is coupled to the DisplayPort source 308 using a DisplayPort cable (or any other suitable technique), and, to the DisplayPort source 308, acts as a DisplayPort sink before retransmitting the DisplayPort information as a DisplayPort source. A switching device 315 is communicatively coupled to the USB upstream facing port 316 and the DisplayPort sink/source 312, and selectively couples conductors associated with the USB upstream facing port 316 (or the downstream-facing portion of a USB hub associated therewith) and conductors associated with the source portion of the DisplayPort sink/source 312 to a bandwidth reduction device and/or pins of the USB Type-C receptacle 314 as discussed in further detail below.

The remote device 306 includes a USB Type-C receptacle 320 coupled to the USB Type-C receptacle 314 of the local device 304 by a cable. As above, the pins of the USB Type-C receptacle 320 are selectively coupled to a lane recovery device and/or conductors of an upstream portion of a hub that includes a USB downstream facing port 322 and/or to conductors of a sink portion of a DisplayPort sink/source 318 by a switching device 321 as discussed in further detail below. The DisplayPort sink/source 318 may be coupled to a DisplayPort sink via a DisplayPort cable (or via any other suitable technique), and the USB downstream facing port 322 may be coupled to a USB device or hub via a USB cable (or via any other suitable technique).

As discussed above with respect to FIG. 2, in some embodiments at least some portions of the switching devices 315, 321 (or the logic thereof) may be embedded within the respective USB upstream facing port 316, USB downstream facing port 322, DisplayPort sink/source 312, or DisplayPort sink/source 318. In some embodiments, the functionality of the switching devices 315, 321 may be provided by embedded ASICs or microcontrollers on printed circuit board assemblies that are communicatively coupled to the other illustrated components. Also, as discussed above, one of the USB Type-C receptacles 314, 320 may be omitted if that end of the cable is captive. Further, one of ordinary skill in the art will recognize that, in some embodiments, a local device 304 could be used with a downstream device 204, or computing device 202 could be used with a remote device 306. In some embodiments, one end of the cable may provide a USB Type-C plug, while the other end of the cable may provide a DisplayPort plug or a USB 2.0 or 3.1 plug. In some embodiments, the bandwidth reduction devices may be used in isolation from USB Type-C or SuperSpeed functionality in order to reduce DisplayPort communication bandwidth over other media, such as standard DisplayPort media.

Figure 4A:
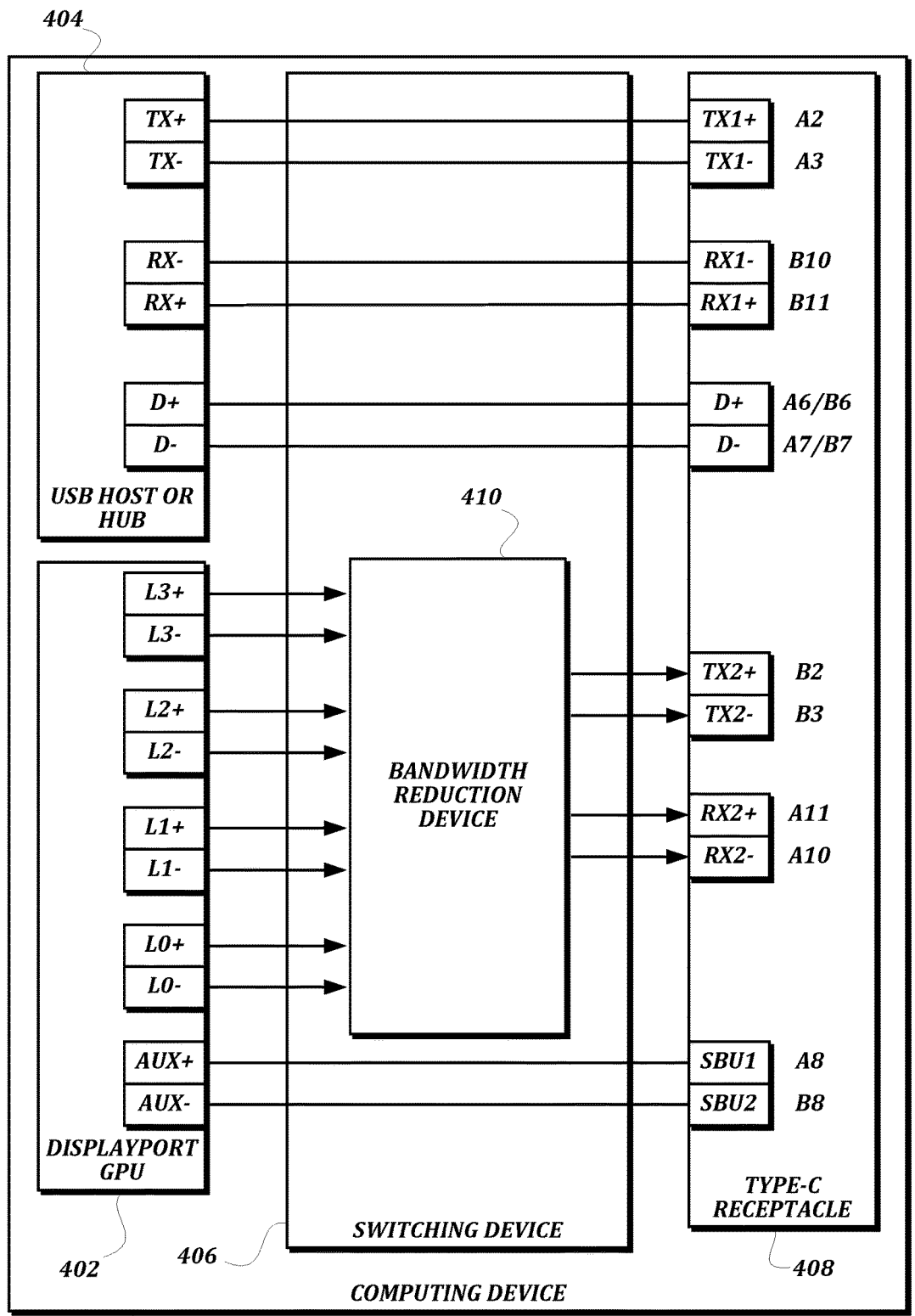
FIG. 4A is a schematic diagram that illustrates an exemplary embodiment of an upstream computing device configured to concurrently communicate SuperSpeed information and four lanes of DisplayPort information via a USB Type-C receptacle according to various aspects of the present disclosure.

FIG. 4A is a schematic diagram that illustrates an exemplary embodiment of an upstream computing device configured to concurrently communicate SuperSpeed information and four lanes of DisplayPort information via a USB Type-C receptacle according to various aspects of the present disclosure. The computing device 400 includes a DisplayPort GPU 402 and a USB host or hub 404 similar to those discussed above.

The USB Type-C receptacle 408 is a standard USB Type-C receptacle, and includes a first pair of SuperSpeed transmit pins A2 and A3, a first pair of SuperSpeed receive pins B10 and B11, a pair of USB 2.0 pins A6 and A7 that may be shorted to a second pair of USB 2.0 pins B6 and B7, a second pair of SuperSpeed transmit pins B2 and B3, a second pair of SuperSpeed receive pins A10 and A11, and two side band use pins A8 and B8. As described in the USB Type-C specification, the USB Type-C receptacle 408 also includes other pins such as ground, $V_{BUS}$, configuration channel (CC), and so on as described in "Universal Serial Bus Type-C Cable and Connector Specification, Revision 1.1." Because embodiments of the present disclosure use these other pins for their standard purposes, they are not illustrated herein or discussed in detail. The USB 2.0 differential pair D+/D− of the USB host or hub 404 may be coupled by the switching device 406 to the USB 2.0 pins A6/B6 and A7/B7 of the USB Type-C receptacle 408, and the AUX differential pair of the DisplayPort GPU 402 may be coupled by the switching device 406 to the two SBU pins A8 and B8 of the USB Type-C receptacle 408.

In some embodiments, the switching device 406 included in the computing device 400 includes a bandwidth reduction device 410. In some embodiments, the functionality of the bandwidth reduction device 410 is provided by the circuitry of the switching device 406. In some embodiments, the bandwidth reduction device 410 may be a separate ASIC, microcontroller, or other similar device that provides the functionality of the bandwidth reduction device 410, and provides one or more conductors to the switching device 406 to be selectively coupled to the DisplayPort GPU 402, the USB host or hub 404, and/or the USB Type-C receptacle 408.

In some embodiments, the switching device 406 selectively couples a differential pair L0+/L0− of the first DisplayPort lane, a differential pair L1+/L1− of the second DisplayPort lane, a differential pair L2+/L2− of the third DisplayPort lane, and a differential pair L3+/L3− of the fourth DisplayPort lane to the bandwidth reduction device 410 or the USB Type-C receptacle 408. In some embodiments, the switching device 406 is configured to exchange capabilities with a device coupled to the USB Type-C receptacle 408 via a cable using USB structured vendor defined messages, a non-standard communication protocol, or any other suitable technique.

In some embodiments, if the switching device 406 determines that the computing device 400 and the device coupled to the USB Type-C receptacle 408 support matching techniques for concurrent transmission of SuperSpeed information and four lanes of DisplayPort information via the USB Type-C receptacle 408, then the switching device 406 couples the differential pairs of the DisplayPort GPU 402 to the bandwidth reduction device 410, and couples one or more output differential pairs of the bandwidth reduction device 410 to pins of the USB Type-C receptacle 408. For example, the switching device 406 may couple a first output differential pair of the bandwidth reduction device 410 to a first set of SuperSpeed pins B2 and B3, and couple a second output differential pair of the bandwidth reduction device 410 to a second set of SuperSpeed pins A10 and A11.

In some embodiments, if the switching device 406 determines that the computing device 400 and the device coupled to the USB Type-C receptacle 408 do not support matching techniques for concurrent transmission of SuperSpeed information and four lanes of DisplayPort information via the USB Type-C receptacle 408 (e.g., one side or the other is lacking a bandwidth reduction device 410 or lane separation device 460 as described below, or the sides do not implement complementary compression/decompression techniques), then the switching device 406 falls back to a standard coupling of conductors from the DisplayPort GPU 402 and USB host or hub 404 directly to the pins of the USB Type-C receptacle 408, such as SuperSpeed only, SuperSpeed plus two lanes of DisplayPort, or DisplayPort only.

One of ordinary skill in the art will also recognize that the routing of signals to particular pins in the USB Type-C receptacle 408 illustrated in FIG. 4A is exemplary only, and that once the bandwidth reduction device 410 has combined the signals from the DisplayPort lanes, any suitable routing of signals to pins in the USB Type-C receptacle 408 may be used.

Figure 4B:
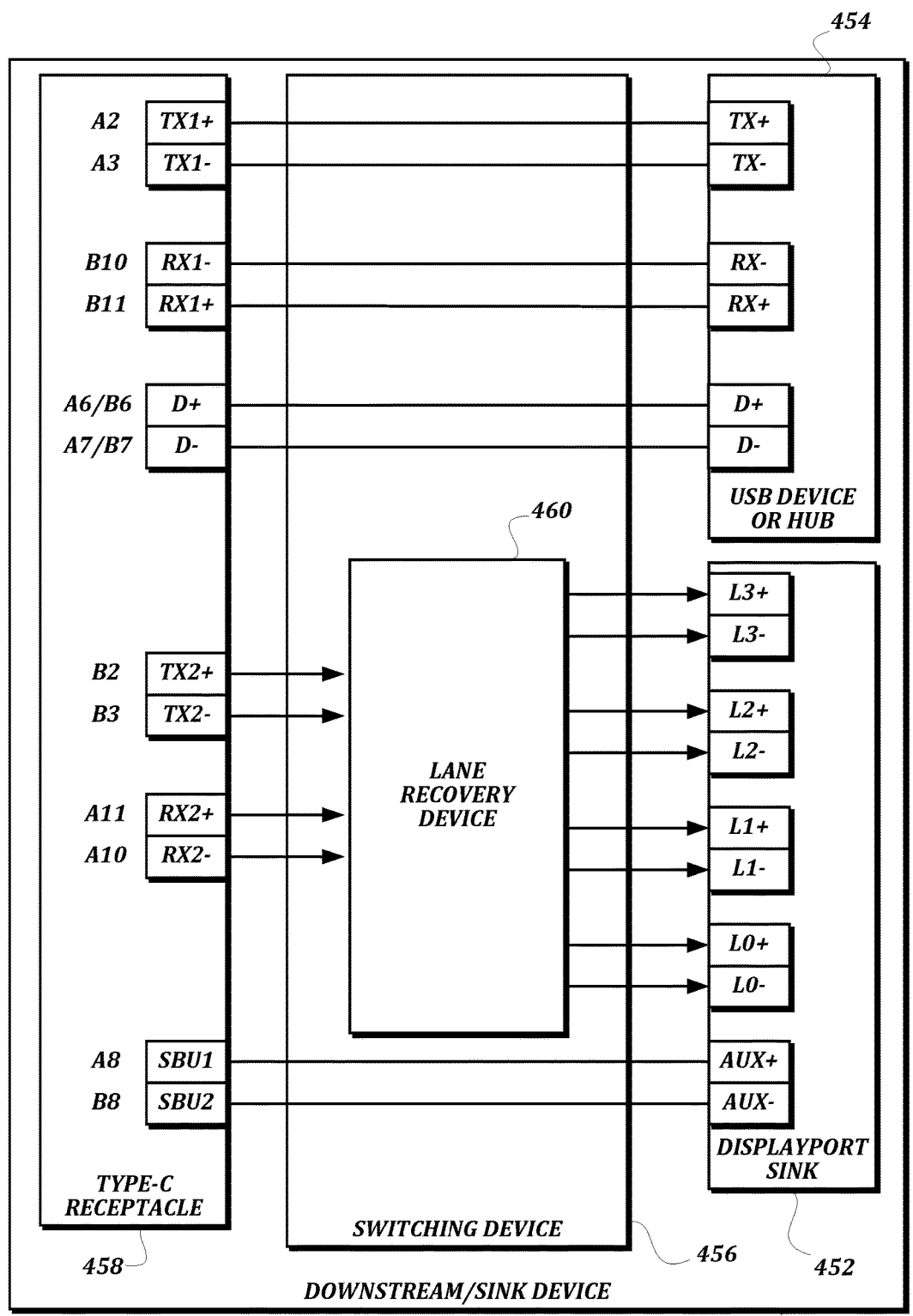
FIG. 4B is a schematic diagram that illustrates an exemplary embodiment of a downstream/sink device configured to concurrently communicate SuperSpeed information and four lanes of DisplayPort information via a USB Type-C receptacle according to various aspects of the present disclosure.

FIG. 4B is a schematic diagram that illustrates an exemplary embodiment of a downstream/sink device configured to concurrently communicate SuperSpeed information and four lanes of DisplayPort information via a USB Type-C receptacle according to various aspects of the present disclosure. The downstream/sink device 450 includes a DisplayPort sink 452 and a USB device or hub 454 similar to those discussed above.

In some embodiments, the downstream/sink device 450 includes components and functionality similar to that provided by the computing device 400, but associated with an upstream facing port instead of a downstream facing port. The USB Type-C receptacle 458 is a standard USB Type-C receptacle, and includes a first pair of SuperSpeed transmit pins A2 and A3, a first pair of SuperSpeed receive pins B10 and B11, a pair of USB 2.0 pins A6 and A7 that may be shorted to a second pair of USB 2.0 pins B6 and B7, a second pair of SuperSpeed transmit pins B2 and B3, a second pair of SuperSpeed receive pins A10 and A11, and two side band use pins A8 and B8. As described in the USB Type-C specification, the USB Type-C receptacle 458 also includes other pins such as ground, $V_{BUS}$, configuration channel (CC), and so on as described in "Universal Serial Bus Type-C Cable and Connector Specification, Revision 1.1." Because embodiments of the present disclosure use these other pins for their standard purposes, they are not illustrated herein or discussed in detail. The USB 2.0 differential pair D+/D− of the USB device or hub 454 may be coupled by the switching device 456 to the USB 2.0 pins A6/B6 and A7/B7 of the USB Type-C receptacle 458, and the AUX differential pair of the DisplayPort sink 452 may be coupled by the switching device 456 to the two SBU pins A8 and B8 of the USB Type-C receptacle 458.

In some embodiments, the switching device 456 included in the downstream/sink device 450 includes a lane recovery device 460. In some embodiments, the functionality of the lane recovery device 460 is provided by the circuitry of the switching device 456. In some embodiments, the lane recovery device 460 may be a separate ASIC, microcontroller, or other similar device that provides the functionality of the lane recovery device 460, and provides one or more conductors to the switching device 456 to be selectively coupled to the DisplayPort sink 452, the USB host or device 454, and/or the USB Type-C receptacle 458.

In some embodiments, the switching device 456 selectively couples a differential pair L0+/L0− of the first DisplayPort lane, a differential pair L1+/L1− of the second DisplayPort lane, a differential pair L2+/L2− of the third DisplayPort lane, and a differential pair L3+/L3− of the fourth DisplayPort lane to the lane recovery device 460 or the USB Type-C receptacle 458. In some embodiments, the switching device 456 is configured to exchange capabilities with a device coupled to the USB Type-C receptacle 458 via a cable using USB structured vendor defined messages, a non-standard communication protocol, or any other suitable technique.

In some embodiments, if the switching device 456 determines that the downstream/sink device 450 and the device coupled to the USB Type-C receptacle 458 support matching techniques for concurrent transmission of SuperSpeed information and four lanes of DisplayPort information via the USB Type-C receptacle 458, then the switching device 456 couples the differential pairs of the DisplayPort sink 452 to the lane recovery device 410, and couples one or more input differential pairs of the lane recovery device 460 to pins of the USB Type-C receptacle 458. For example, the switching device 456 may couple a first set of SuperSpeed pins B2 and B3 to a first input differential pair of the lane recovery device 460, and may couple a second set of SuperSpeed pins A10 and A11 to a second input differential pair of the lane recovery device 460.

In some embodiments, if the switching device 456 determines that the downstream/sink device 450 and the device coupled to the USB Type-C receptacle 458 do not support matching techniques for concurrent transmission of SuperSpeed information and four lanes of DisplayPort information via the USB Type-C receptacle 458 (e.g., one side or the other is lacking a bandwidth reduction device 410 or lane separation device 460, or the sides do not implement complementary compression/decompression techniques), then the switching device 456 falls back to a standard coupling of conductors from the DisplayPort sink 452 and USB device or hub 454 directly to the pins of the USB Type-C receptacle 458, such as SuperSpeed only, SuperSpeed plus two lanes of DisplayPort, or DisplayPort only.

One of ordinary skill in the art will also recognize that the routing of signals to particular pins in the USB Type-C receptacle 458 illustrated in FIG. 4B is exemplary only, and that any suitable routing of signals from pins in the USB Type-C receptacle 458 to the USB device or hub 454, the DisplayPort sink 452, and/or the lane recovery device 460 may be used.

Figure 5A:
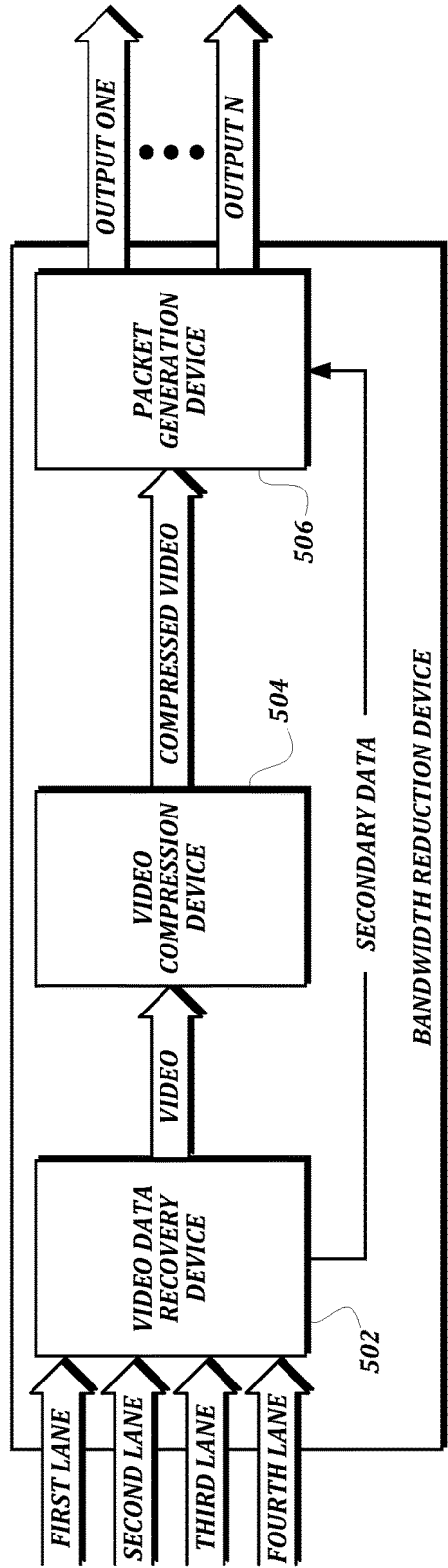
FIG. 5A is a block diagram that illustrates an exemplary embodiment of a bandwidth reduction device according to various aspects of the present disclosure.

FIG. 5A is a block diagram that illustrates an exemplary embodiment of a bandwidth reduction device according to various aspects of the present disclosure. As illustrated, the bandwidth reduction device 410 comprises a video data recovery device 502, a video compression device 504, and a packet generation device 506. In some embodiments, each of these devices 502, 504, and 506 may be separate components on a printed circuit board assembly. In some embodiments, one or more of these devices 502, 504, and 506 may be combined together into one or more ASICs or microcontrollers. In some embodiments, functionality for one or more of these devices 502, 504, and 506 may be implemented by a general purpose computing device executing computer-executable instructions that cause the computing device to enact the described functionality, thus creating a special purpose computing device.

In some embodiments, the bandwidth reduction device 410 includes inputs for a first lane, a second lane, a third lane, and a fourth lane of DisplayPort data. These inputs may each be provided using a differential pair of conductors that the switching device 406 may selectively couple to the differential pairs of the DisplayPort GPU 402. The inputs are configured to provide the DisplayPort data to the video data recovery device 502. In some embodiments, the bandwidth reduction device 410 also includes one or more outputs. These outputs may also be provided using differential pairs of conductors, and the switching device 406 may selectively couple the output differential pairs to pins of the USB Type-C receptacle 408. The outputs are configured to receive the reduced bandwidth signals from the packet generation device 506 and provide them to the pins of the USB Type-C receptacle 408.

The bandwidth reduction device 410 is described and illustrated as having "one or more" outputs because the number of outputs may be different. For example, the embodiments illustrated in FIGS. 4A and 4B include two outputs, so that four lanes of DisplayPort information may be transmitted over two differential pairs and thereby be concurrently transmitted via a USB Type-C receptacle along with SuperSpeed information. In other embodiments, different numbers of outputs may be used. For example, in some embodiments, the bandwidth of four lanes of DisplayPort information (or two lanes of DisplayPort information) may be reduced enough to be transmitted via a single output differential pair. As another example, in some embodiments, four lanes of DisplayPort information may have their bandwidth reduced by the bandwidth reduction device 410, but then be transmitted over four output differential pairs. This reduction in bandwidth (but not in lanes) may allow the DisplayPort information to be transmitted via a cable or over a medium that would not otherwise be able to handle the full bandwidth information due to cable length, medium quality, or for any other reason.

The video data recovery device 502 is configured to receive the DisplayPort data from the DisplayPort GPU 402 and to convert it back into the source video data (or another format suitable for compression) so that the source video data may be compressed. In some embodiments, the source video data may be an output of a frame buffer, DisplayPort video frames before serialization, or any other suitable format. In some embodiments, the video data recovery device 502 performs one or more standard steps for recovering the source video data from the lanes of DisplayPort data, such as $8b/10b$ decoding, descrambling, de-encrypting (if encryption is enabled on the DisplayPort GPU 402), clock recovery, lane alignment, and de-packetization. In some embodiments, the video data recovery device 502 may also extract secondary data from the incoming DisplayPort information, including but not limited to audio, video markers, and/or symbols, and make the secondary data available separately from the source video data.

The video compression device 504 is configured to receive the source video data from the video data recovery device 502. The source video data may be provided to the video compression device 504 in any suitable format, such as line by line, frame by frame, or in any other desired format. The video compression device 504 uses any suitable technique to compress the source video data in order to reduce the bandwidth needed for transmission. In some embodiments, the video compression device 504 may remove frames from the source video data, for example, removing every other frame in order to reduce the bandwidth by half. In some embodiments, the video compression device 504 may use a lossless compression technique. In some embodiments, the video compression device 504 may use a 4:2:0 color space conversion, in which case the bandwidth of the source video data may be reduced by 50%. In some embodiments, the video compression device 504 may use a 4:2:2 color space conversion, in which case the bandwidth of the source video data may be reduced by 33%. In some embodiments, a lossy compression technique, including but not limited to H.264, H.265, or JPEG2000, may be used. In some embodiments, some other suitable compression technique may be used. The video compression device 504 then outputs the compressed video data to the packet generation device 506.

The packet generation device 506 is configured to receive the compressed video data and place it in a format suitable for transmission via the one or more outputs. In some embodiments, the packet generation device 506 also includes the secondary data received from the video data recovery device 506 along with the output, either in a combined output or in separate outputs. Any suitable transmission technique may be used. For example, in some embodiments, the packet generation device 506 includes a SERDES device that generates one or more serial signals representing the compressed video data and the secondary data. As another example, in some embodiments the packet generation device 506 may be configured to packetize the compressed video data and the secondary data using packetization, serialization, lane generation, and/or encryption techniques similar to those used in DisplayPort.

In some embodiments, some components of the bandwidth reduction device 410 may be missing or bypassed. For example, the DisplayPort lanes may be provided directly to the packet generation device without being processed by the video data recovery device 502 or the video compression device 504. This would allow, for example, a higher-speed SERDES than provided in the DisplayPort specification to be used by the packet generation device 506 to combine and/or aggregate multiple lanes of DisplayPort information into a fewer number of lanes. In some such embodiments, a higher quality cable or a shorter cable may be used to achieve successful transmission.

Figure 5B:
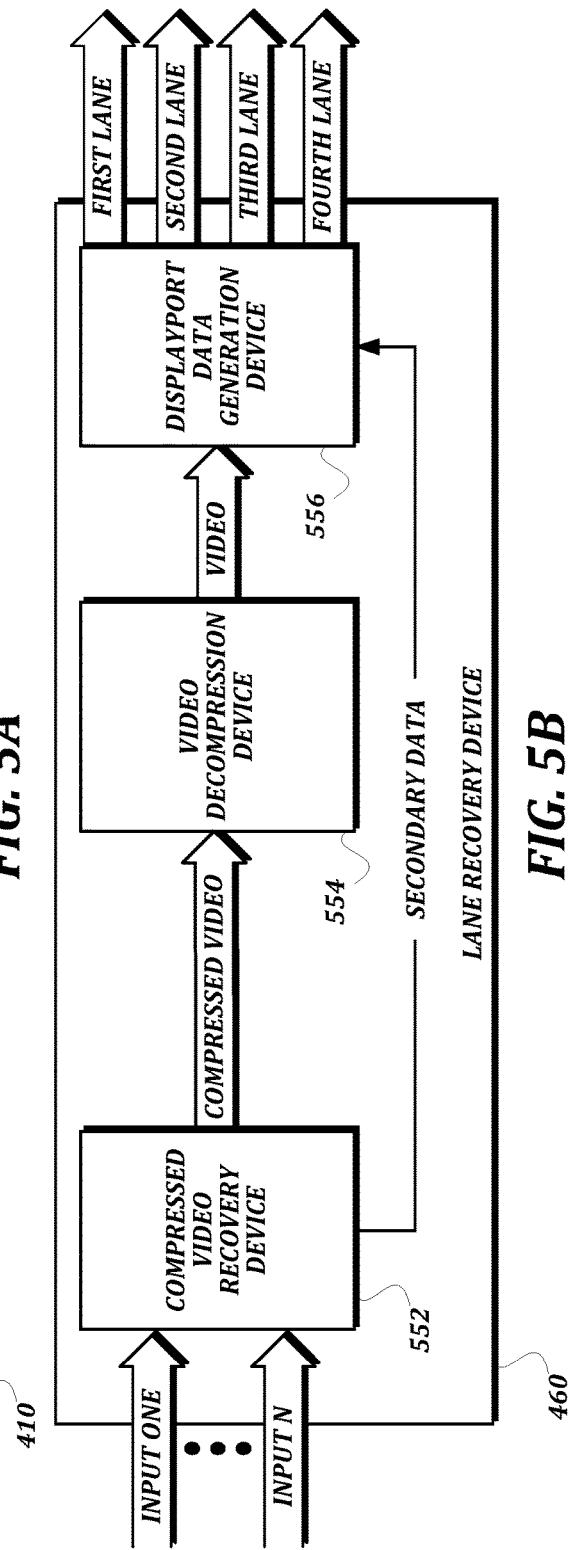
FIG. 5B is a block diagram that illustrates an exemplary embodiment of a lane recovery device according to various aspects of the present disclosure.

FIG. 5B is a block diagram that illustrates an exemplary embodiment of a lane recovery device according to various aspects of the present disclosure. The lane recovery device 460 is suitable to receive the output of the bandwidth reduction device 410 and generate DisplayPort data representing the source video data. As illustrated, the lane recovery device 460 comprises a compressed video recovery device 552, a video decompression device 554, and a DisplayPort data generation device 556. In some embodiments, each of these devices 552, 554, and 556 may be separate components on a printed circuit board assembly. In some embodiments, one or more of these devices 552, 554, and 556 may be combined together into one or more ASICs or microcontrollers. In some embodiments, functionality for one or more of these devices 552, 554, and 556 may be implemented by a general purpose computing device executing computer-executable instructions that cause the computing device to enact the described functionality, thus creating a special purpose computing device.

In some embodiments, the lane recovery device 460 includes one or more inputs. The inputs may each be provided using a differential pair of conductors that the switching device 456 may selectively couple to pins of the USB Type-C receptacle 458. The inputs are configured to provide the output of the bandwidth reduction device 410 to the compressed video recovery device 552. In some embodiments, the lane recovery device 460 also includes outputs for a first lane, a second lane, a third lane, and a fourth lane of DisplayPort data. These outputs may also be provided using differential pairs of conductors, and the switching device 456 may selectively couple the output differential pairs to the DisplayPort sink 452.

The lane recovery device 460 is described and illustrated as having "one or more" inputs because the number of inputs may be different. As discussed above with respect to the bandwidth reduction device 410, one, two, or four differential pairs may be used to transmit the output of the packet generation device 506, and so the lane recovery device 460 uses a corresponding number of inputs. For a given connection, the number of inputs used may be negotiated between the bandwidth reduction device 410 and the lane recovery device 460 using any suitable method, including but not limited to USB structured vendor defined messages.

The compressed video recovery device 552 is configured to receive the one or more outputs of the bandwidth reduction device 410 as inputs, and to extract the compressed video data therefrom. One of ordinary skill in the art will recognize that any suitable complementary technique to that used to generate the outputs may be used. For example, if the packet generation device 506 used a SERDES device to serialize the compressed video data, then the compressed video recovery device 552 may use a SERDES device to deserialize the one or more inputs to recover the compressed video data. As another example, if the packet generation device 506 used techniques similar to those used in DisplayPort to packetize the compressed video data, then the compressed video recovery device 552 may perform techniques such as $8b/10b$ decoding, descrambling, de-encrypting, clock recovery, lane alignment, and de-packetization to recover the compressed video. The appropriate technique to use may be negotiated using USB structured vendor defined messages, may be determined using a characteristic of the input, or may be determined using any other suitable technique. The compressed video recovery device may also recover the secondary data and provide it separately from the compressed video data.

The video decompression device 554 is configured to receive the compressed video data from the compressed video recovery device 552. The video decompression device 554 then uses a complementary technique to that used by the video compression device 504 in order to generate video data representing the source video data. For example, if frames were removed from the source video data to reduce the bandwidth, then the compressed video data is substantially similar to the source video data, but at a lower frame rate. Accordingly, the video decompression device 554 may duplicate frames from the compressed video data in order to generate video data having a frame rate that matches a frame rate of the source video data. As another example, if a technique such as 4:2:0 color space conversion, 4:2:2 color space conversion, H.264, H.265, or JPEG2000 was used for compression, a complementary technique may be used for decompression.

The DisplayPort data generation device 556 is configured to receive the video data from the video decompression device 554, and to generate a first lane, a second lane, a third lane, and a fourth lane of DisplayPort information for transmission to the DisplayPort sink 452. The video data may be provided to the DisplayPort data generation device 556 in any suitable format, such as line by line, frame by frame, or in any other desired format. In some embodiments, the DisplayPort data generation device 556 also uses the secondary data in generating the lanes of DisplayPort information. In some embodiments, the DisplayPort data generation device 556 uses DisplayPort techniques familiar to one of ordinary skill in the art to generate the lanes of DisplayPort information from the video data and the secondary data. One of ordinary skill in the art will recognize that the output of the lane recovery device 556 is similar to the input to the video data recovery device 502, though possibly not identical.

Though the use of four lanes of DisplayPort information are illustrated and described, one of ordinary skill in the art will recognize that less than four lanes of DisplayPort information may be processed by embodiments of the present disclosure, and that an actual number of lanes to be used may be negotiated between the source and the sink during DisplayPort link training. Also, one of ordinary skill in the art will recognize that, while in some embodiments, a full supported bandwidth of each DisplayPort lane may be received by the bandwidth reduction device 410 for processing, in some embodiments, one or more of the DisplayPort lanes received by the bandwidth reduction device 410 may not be using its full supported bandwidth for the transmission of information.

Figure 6:
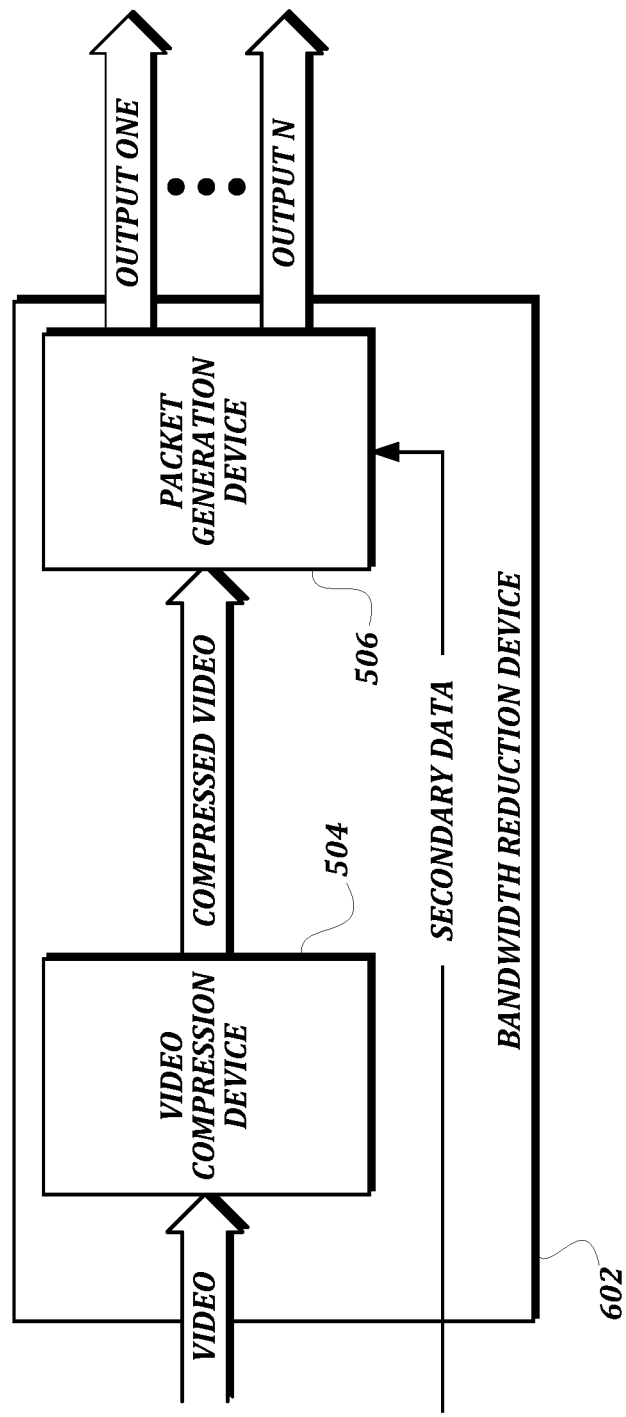
FIG. 6 is a block diagram that illustrates another exemplary embodiment of a bandwidth reduction device according to various aspects of the present disclosure.

FIG. 6 is a block diagram that illustrates another exemplary embodiment of a bandwidth reduction device according to various aspects of the present disclosure. In FIG. 6, an embeddable bandwidth reduction device 602 is illustrated. The components of the bandwidth reduction device 602 are similar to those illustrated and described above with respect to bandwidth reduction device 410 in FIG. 5A, including the video compression device 504, the packet generation device 506, and the one or more outputs. However, the video compression device 504 of the bandwidth reduction device 602 receives the source video data directly, instead of receiving the packetized output of the DisplayPort GPU 402. This type of bandwidth reduction device 602 may be used outside of the systems illustrated in FIGS. 2 and 3, and may instead receive the source video data directly from a video source. For example, the bandwidth reduction device 602 may receive DisplayPort video frames directly from the DisplayPort GPU 402 before the DisplayPort GPU 402 serializes the information into one or more lanes. As another example, the bandwidth reduction device 602 may receive the source video data directly from a frame buffer. At the sink side, a lane recovery device 460 may receive the output from the bandwidth reduction device 602.

While illustrative embodiments have been illustrated and described, it will be appreciated that various changes can be made therein without departing from the spirit and scope of the invention. For example, embodiments are discussed above wherein a switching device selectively couples inputs and/or outputs to a bandwidth reduction device or a lane recovery device. In some embodiments, the coupling of input and output conductors of the bandwidth reduction device and/or the lane recovery device may not change, and instead of changing the coupling of the conductors the switching device may selectively enable or disable functionality of the bandwidth reduction device and/or the lane recovery device. As another example, embodiments are discussed above that primarily relate to DisplayPort information, but in some other embodiments, other techniques for processing packetized and/or serialized video data, including but not limited to Mobile High-Definition Link (MHL), may be used.

The embodiments of the invention in which an exclusive property or privilege is claimed are defined as follows:

1. A system comprising:
   a USB device or hub;
   a DisplayPort sink;
   a lane recovery device;
   a USB Type-C receptacle for use as an upstream facing port (UFP); and
   a switching device communicatively coupled to the USB device or hub, the DisplayPort sink, the lane recovery device, and the USB Type-C receptacle; wherein the switching device is configured to:
   determine whether a downstream facing port (DFP) coupled to the USB Type-C receptacle supports reduced bandwidth transmission of DisplayPort information; and
   in response to determining that the DFP does support reduced bandwidth transmission of DisplayPort information:
   couple a first lane differential pair, a second lane differential pair, a third lane differential pair, and a fourth lane differential pair of the DisplayPort sink to the lane recovery device; and
   couple one or more input differential pairs of the lane recovery device to pins of the USB Type-C receptacle.

2. The system of claim 1, wherein the lane recovery device includes a video decompression device configured to:
   receive compressed video data via the one or more input differential pairs;
   decompress the compressed video data using a video decompression technique to recover source video data; and
   transmit the source video data as four lanes of DisplayPort data via the first lane differential pair, the second lane differential pair, the third lane differential pair, and the fourth lane differential pair.

3. The system of claim 2, wherein the video decompression technique is related to a lossless compression technique that includes a 4:2:0 color space conversion or a 4:2:2 color space conversion; or a lossy compression technique that includes at least one of H.264, H.265, or JPEG2000.

4. The system of claim 2, wherein the compressed video data is a version of the source video data with video frames removed to reduce a bandwidth of the source video data; and wherein decompressing the compressed video data includes duplicating existing video frames to replace the removed video frames and thereby create output video data that matches a frame rate of the source video data.

5. The system of claim 2, wherein the lane recovery device includes a SERDES device configured to:
   deserialize a serial signal received via the one or more input differential pairs to recover the compressed video data.

6. The system of claim 1, wherein the lane recovery device is further configured to recover at least one of audio data, video markers, and symbols from a signal received via the one or more input differential pairs, and to transmit the at least one of audio data, video markers, and symbols in the four lanes of DisplayPort data.

7. The system of claim 1, wherein the switching device is further configured to couple a SuperSpeed transmit differential pair from the USB device or hub to a third pair of SuperSpeed pins of the USB Type-C receptacle, and to couple a SuperSpeed receive differential pair from the USB device or hub to a fourth pair of SuperSpeed pins of the USB Type-C receptacle.

8. A lane recovery device configured to be coupled via a switching device to a USB Type-C receptacle configured to provide an upstream facing port (UFP), wherein the lane recovery device is configured to:
receive packetized data via one or more input differential pairs from the USB Type-C receptacle;
recover compressed video data from the packetized data;
decompress the compressed video data to recover source video data using a technique related to a video compression technique used to compress the source video data; and
transmit four lanes of DisplayPort information based on the source video data to a DisplayPort sink.

9. The lane recovery device of claim 8, wherein the switching device is configured to:
determine whether a downstream facing port (DFP) coupled to the USB Type-C receptacle supports concurrent transmission of SuperSpeed information and four lanes of DisplayPort information; and
in response to determining that the DFP does support concurrent transmission of SuperSpeed information and four lanes of DisplayPort information:
couple a first lane differential pair, a second lane differential pair, a third lane differential pair, and a fourth lane differential pair from a DisplayPort sink to the lane recovery device; and
couple a first input differential pair of the lane recovery device to a first pair of SuperSpeed pins of the USB Type-C receptacle and couple a second input differential pair of the lane recovery device to a second pair of SuperSpeed pins of the USB Type-C receptacle.

10. The lane recovery device of claim 8, wherein the video compression technique includes at least one of a lossless compression technique and a lossy compression technique.

11. The lane recovery device of claim 10, wherein the lossy compression technique includes at least one of H.264, H.265, or JPEG2000.

12. The lane recovery device of claim 8, wherein the video compression technique includes dropping frames from the source video data, and wherein the technique related to the video compression technique includes replacing dropped video frames by duplicating frames from the compressed video data.

13. The lane recovery device of claim 8, wherein the switching device is further configured to couple a Super-Speed transmit differential pair from a USB device or hub to a third pair of SuperSpeed pins of the USB Type-C receptacle, and to couple a SuperSpeed receive differential pair from the USB device or hub to a fourth pair of SuperSpeed pins of the USB Type-C receptacle.

14. The lane recovery device of claim 8, wherein the lane recovery device is further configured to recover at least one of audio data, video markers, and symbols from the packetized data, and wherein the four lanes of DisplayPort information are also based on the at least one of audio data, video markers, and symbols.

15. A method for receiving reduced bandwidth Display-Port information via an upstream facing port (UFP) that includes a USB Type-C connector, the method comprising:
exchanging capabilities between the UFP and a downstream facing port (DFP); and
in response to determining that both the DFP and the UFP support matching techniques for communicating reduced bandwidth DisplayPort information:
providing signals from one or more pairs of Super-Speed pins of the USB Type-C receptacle to one or more inputs of a lane recovery device; and
providing a first lane of DisplayPort information, a second lane of DisplayPort information, a third lane of DisplayPort information, and a fourth lane of DisplayPort information from the lane recovery device to a DisplayPort sink.

16. The method of claim 15, further comprising:
performing, by the lane recovery device, depacketization on signals received via the one or more inputs to recover compressed video data; and
performing, by the lane recovery device, decompression of the compressed video data to recover source video data.

17. The method of claim 16, wherein performing decompression includes performing a decompression technique associated with a lossless compression technique or a lossy compression technique.

18. The method of claim 16, wherein performing decompression includes performing a decompression technique associated with a 4:2:0 color space conversion or a 4:2:2 color space conversion.

19. The method of claim 16, wherein performing decompression includes duplicating video frames within the compressed video data to replace dropped video frames and thereby match a frame rate of the source video data.

20. The method of claim 15, further comprising:
coupling a SuperSpeed transmit differential pair from a USB device or hub to a third pair of SuperSpeed pins of the USB Type-C receptacle; and
coupling a SuperSpeed receive differential pair from the USB device or hub to a fourth pair of SuperSpeed pins of the USB Type-C receptacle.

* * * * *